United States Patent [19]

Baba

[11] Patent Number: 4,625,501
[45] Date of Patent: Dec. 2, 1986

[54] CUTTER BLADE DEVICE OF MOWING MACHINE

[75] Inventor: Toru Baba, Yokosuka, Japan

[73] Assignee: Kioritz Corporation, Tokyo, Japan

[21] Appl. No.: 701,241

[22] Filed: Feb. 13, 1985

[30] Foreign Application Priority Data

Feb. 14, 1984 [JP] Japan .................... 59-19583[U]

[51] Int. Cl.⁴ ............................................ A01D 34/67
[52] U.S. Cl. ........................................ 56/12.7; 30/276
[58] Field of Search .................... 56/12.7; 30/276, 347

[56] References Cited

U.S. PATENT DOCUMENTS

| | | | |
|---|---|---|---|
| 3,859,776 | 1/1975 | Ballas et al. | 56/12.7 |
| 4,091,538 | 5/1978 | Akiyama | 56/12.7 |
| 4,097,991 | 7/1978 | Prouly | 56/12.7 |
| 4,136,446 | 1/1979 | Tripp | 56/12.7 |
| 4,161,820 | 7/1979 | Moore | 30/276 |
| 4,168,572 | 9/1979 | Ewing | 56/12.7 |
| 4,177,561 | 12/1979 | Ballas | 56/12.7 |
| 4,194,287 | 3/1980 | Palmieri et al. | 30/276 |
| 4,287,670 | 9/1981 | Baker | 56/12.7 |
| 4,458,419 | 7/1984 | Prouly | 30/278 |
| 4,483,069 | 11/1984 | Moore | 56/12.7 |

Primary Examiner—Paul J. Hirsch
Attorney, Agent, or Firm—Browdy and Neimark

[57] ABSTRACT

A cutter blade device of a mowing machine including a spool having a cylindrical portion on which a flexible cord is wound in coil form, and a boss to which the spool is fitted and secured. The boss is adapted to be mounted on a drive shaft of the mowing machine to drive a casing for rotation. A depression extending axially of the cylindrical portion is formed on an inner side thereof which faces the boss when the latter is fitted in a bore of the cylindrical portion while a through hole is formed to extend through the cylindrical portion from an outer side and open in a space defined between the depression and the boss. An inner end portion of the cord is inserted through the through hole and bent in the space between the depression and the boss so as to be held in place in bent condition between the cylindrical portion of the spool and the boss.

3 Claims, 5 Drawing Figures

CUTTER BLADE DEVICE OF MOWING MACHINE

BACKGROUND OF THE INVENTION

This invention relates to a cutter blade device of a mowing machine including a flexible cord, such as a nylon cord, wound and held in the machine to serve as a cutter for cutting grass.

This type of cutter blade device comprises a spool mounted in a casing of the mowing machine and supported at a lower end of a drive shaft for rotating the casing, and flexible cords, such as nylon cords, wound on the spool in a multiplicity of windings to form a coil of cords of substantially uniform thickness. Outer end portions of the cords are drawn out in a predetermined length from the casing through a peripheral wall thereof to outside to serve as cutter blades. In this type of device, it is essential that the cords be firmly secured at their inner end portions to the spool. If the inner end portions of the cords were not securely connected to the spool, the coil of cords on the spool might become disintegrated causing a variety of problems including entanglement, interference with drawing out of the cords or loss of the cords entirely from the casing during operation. To obviate such problems, it has hitherto been necessary to insert the inner end portions of the cords in openings formed in flanges of the spool and provide knots at the ends of the inserted cords for securely holding the cords at the flanges. This operation has usually been performed manually and it has been time-consuming and troublesome to perform such operation. Thus, supplementing the coil of cords has required an operation which is difficult to perform.

SUMMARY OF THE INVENTION

This invention has been developed for the purpose of obviating the aforesaid disadvantages of the prior art. Accordingly, the invention has as its object the provision of a cutter blade device of a mowing machine which is simple in construction and easy to handle.

The outstanding characteristics of the invention enabling the aforesaid object to be accomplished are that a spool on which flexible cords are wound in coil form is fitted and secured to a boss to be mounted on a drive shaft for driving a casing of the mowing machine; depressions extending axially of a cylindrical portion of the spool are formed on an inner side thereof which faces the boss when the latter is fitted in a bore of the cylindrical portion while through holes extend through the cylindrical portion from an outer side and open in spaces defined between the depressions and the boss; and inner end portions of the cords are held in place in the spaces defined between the depressions and the boss.

By virtue of the aforesaid constituent feature of the invention, it is possible to eliminate the need to use a special cord holding structure or an additional part for securely holding the inner end portions of the cords and to prevent the trouble that the coil of cords might be disintegrated or the cords might be inadvertently drawn out entirely from the casing, because the inner end portions of the cords are inserted in the bore of the cylindrical portion of the spool via the through holes formed in the cylindrical portion to hold same in bent condition between the cylindrical portion of the spool and the boss. The feature that the depressions extend axially causes the inner end portions of the cords to be naturally bent axially in the spaces between the depressions and the boss and held therein in bent condition without requiring any further manual attention, thereby facilitating assembling of the cutter blade device.

DESCRIPTION OF THE PREFERRED EMBODIMENT

A preferred embodiment of the invention will now be described by referring to the accompanying drawings.

Figure 1:
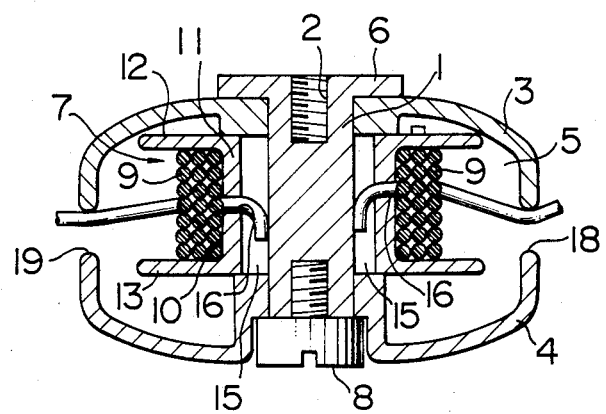
FIG. 1 is a schematic vertical sectional view of the essential portions of the cutter blade device of the mowing machine comprising one embodiment of the invention.

The cutter blade device comprises a boss 1 shown in FIG. 1 which is formed with an internally threaded opening 2 in an upper end portion for threadably receiving an externally threaded lower end portion of a rotary drive shaft of the mowing machine during operation.

Figure 2:
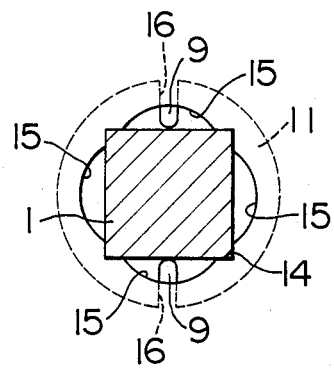
FIG. 2 is a plan view, in explanation of the manner in which the spool is fitted to the boss in the cutter blade device shown in FIG. 1.

Referring to FIG. 2, the boss 1 is square in cross-sectional shape, and casing members 3 and 4 are fitted to an outer periphery of the boss 1 to define therebetween an annular inner space 5 as shown in FIG. 1. The casing member 3 is positioned such that it abuts from below against a flange 6 formed at an upper end of the boss 1 integrally therewith, and the casing member 4 cooperates with the casing member 3 to hold a spool 7 therebetween. A screw 8 threadably connected to a lower end portion of the boss 1 forces the casing member 4 to move upwardly until it is securely connected to the boss 1.

Figure 3:
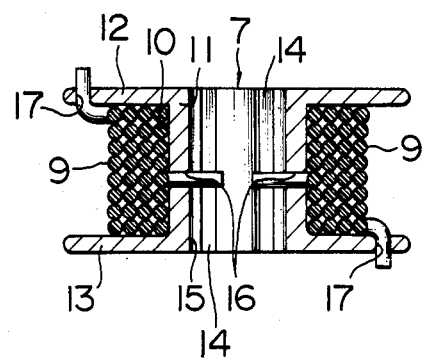
FIG. 3 is a vertical sectional view of the spool shown in FIG. 1, showing the cords wound on the spool in coil form.
Figure 4:
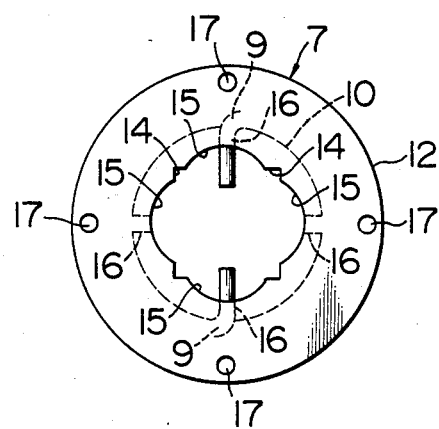
FIG. 4 is a plan view of the spool shown in FIG. 3.

The spool 7 comprises a cylindrical portion 11 having a cylindrical outer surface 10 on which a flexible cord 9, such as a nylon cord, is wound, and flanges 12 and 13 located at opposite ends of the cylindrical portion 11 and formed integrally therewith. The cylindrical portion 11 is formed on its inner surface with four notches 14 (see FIGS. 2 and 4) located equidistantly from each other and each forming an angle of 90 degrees, so that when the boss 1 is inserted in a bore of the cylindrical portion 11, each corner of the boss 1 of the square cross-sectional shape is snugly received in one of the four notches 14. A depression 15 extending axially is formed substantially in a central portion of each section of the inner surface of the cylindrical portion 11 disposed between the adjacent notches 14. The depressions 15 are sized such that when the boss 1 is inserted in the bore of the cylindrical portion 11, the distance between each side of the boss 1 and each section of the inner surface of the cylindrical portion 11 is at least 0.5 mm greater than the diameter of the cord 9. The cylindrical portion 11 is formed with through holes 16 extending from its outer surface to the depressions and having a diameter large enough to allow the cord 9 to extend therethrough. The flanges 12 and 13 are formed at their outer peripheral portions with through holes 17 (see FIGS. 3 and 4) to allow the cord 9 extend therethrough.

In assembling the cutter blade device of the aforesaid construction, two cords 9 of a suitable material are prepared to serve as cutter blades, and one end or an inner end of each cord 9 is inserted from outside in one of the two diametrically opposed through holes 16 formed in the cylindrical portion 11 of the spool 7 until the end portion of each cord 9 extends in a suitable length of about 5 to 10 mm into one of spaces defined between the depressions 15 on the cylindrical portion 11 and the sides of the boss 1. Then, the cords 9 are wound substantially uniformly on the outer surface 10 of the cylindrical portion 11 in a direction opposite the direction in which the casing is rotated to form a coil of cords 9. When the spool 7 is not assembled with the boss 1, an opposite end or an outer end of each cord 9 is inserted in one of the through holes 17 formed in the flanges 12 and 13 of the spool 7, to ensure that the cords 9 remain wound in coil form on the cylindrical portion 11 of the spool 7. Thereafter, the casing member 3, spool 7 and casing member 4 are fitted to the boss 1 in the indicated order, and the screw 8 is threadably connected to the boss 1 to assemble them to provide a unitary structure while the outer ends of the cords 9 are drawn out through the openings 18 and 19 defined between walls of the casing members 3 and 4 so that outer end portions of the cords 9 stick out of the casing to outside. When the spool 7 is fitted to the boss 1, the inner end portions of the cords 9 are axially bent in the spaces between the axially extending depressions 15 on the cylindrical portion 11 and the sides of the boss 1, to thereby automatically fix the cords 9 in place.

Figure 5:
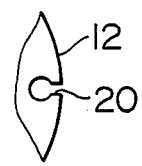
FIG. 5 is a view, partly broken away, of another constructional form of flange of the spool.

FIG. 5 shows another constructional form of the flanges 12 and 13 of the spool 7. The through holes 17 shown in FIG. 4 as being formed in the flange 12 may be in the form of an opening 20 of a circular shape which is partially cut at an outer portion in the form of a slit as viewed from the side.

Although not shown, an annular inertia shifter capable of being brought into and out of engagement with the casing members 3 and 4 in a position disposed anterior thereto with respect to the direction of rotation of the casing members 3 and 4 mounted for sliding and rotary movements is mounted in the inner space 5 in the vicinity of the spool 7. The provision of the annular inertia shifter enables the cords 9 to be automatically payed out of the spool 7 and drawn out to outside through the openings 18 and 19 as the outer end portions of the cords 9 sticking out of the casing are worn out, so as to thereby enbable the operation to be continued without interruption.

What is claimed is:

1. A cutter blade device for a mowing machine, comprising:
   a spool of generally cylindrical configuration having a cylindrical outer wall portion and a non-cylindrical inner wall;
   a flexible cord wound in coil form on said cylindrical outer wall portion of said spool;
   a boss adapted to be mounted on a drive shaft for driving a casing of the mowing machine for rotation, said boss being received axially within the non-cylindrical inner wall of said spool so that said spool and said boss are rotatively fixed relative to one another, and so that said non-cylindrical inner wall of said spool and the exterior surface of said boss define therebetween at least one axially extending depression to receive an inner end portion of said cord;
   a through hole formed in the cylindrical outer wall portion of the spool and opening into the non-cylindrical inner wall of said spool at the axially extending depression; and
   wherein said inner end portion of the cord is led through said through hole into the axially extending depression and is bent and held in position therein.

2. A cutter blade device according to claim 1 wherein said boss is square in cross section having four equally spaced corners, and is retained in said non-cylindrical interior wall of said spool by four axially extending notches of said non-cylindrical inner wall into which the corners of said boss fit.

3. A cutter blade device according to claim 2 wherein said non-cylindrical inner wall of said spool comprises an elongated hemi-cylindrical cavity between each pair of adjacent boss corner rceiving notches, said hemi-cylindrical cavities being spaced equally about the interior of said spool, and wherein said axially extending depression comprises one of said hemi-cylindrical cavities.

* * * * *